US006980316B2

(12) United States Patent
Sugiyama (10) Patent No.: US 6,980,316 B2
(45) Date of Patent: Dec. 27, 2005

(54) TANDEM TYPE COLOR PRINTER CAPABLE OF MAKING PLURAL COPIES OF PRINTED MATTER AT HIGH SPEED

(75) Inventor: Fumiaki Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 934 days.

(21) Appl. No.: 09/813,895

(22) Filed: Mar. 22, 2001

(65) Prior Publication Data

US 2001/0024296 A1    Sep. 27, 2001

(30) Foreign Application Priority Data

Mar. 23, 2000    (JP) ............................. 2000-082761

(51) Int. Cl.$^7$ ............................................ G06K 15/02
(52) U.S. Cl. ................... 358/1.16; 399/383; 399/83; 399/75; 358/1.17; 355/88; 355/89
(58) Field of Search .......................... 358/1.1, 1.2, 1.3, 358/1.4, 1.5, 1.6, 1.7, 1.8, 1.9, 1.11, 1.12, 358/1.13, 1.14, 1.15, 1.16, 1.17, 1.18, 296; 399/75, 82, 83, 362, 364, 381, 383, 145; 355/82, 88, 89

(56) References Cited

U.S. PATENT DOCUMENTS 6,198,896 B1 *   3/2001   Nakayasu et al. ........... 399/301
6,714,748 B1 *   3/2004   Nakayasu et al. ............ 399/72

FOREIGN PATENT DOCUMENTS

JP    11-143163    5/1999    ........... G03G 15/01

* cited by examiner

Primary Examiner—King Y. Poon
(74) Attorney, Agent, or Firm—McGinn IP Law Group, PLLC (57) ABSTRACT

In a tandem type color printer, a second memory memorizes bitmap data sets in a second arrangement. In the second arrangement, each of the bitmap data sets is divided into a plurality of data units. In addition, the data units of all of the bitmap data sets are arranged on the basis of predetermined output order regardless of the colors. A first memory separately memorizes the bitmap data sets in a first arrangement different from the second arrangement. A data line control circuit reads out the bitmap data sets from the first memory when a first copy of a printed matter is made by the use of the bitmap data sets. In this time, the data line control circuit stores the bitmap data sets in the second memory with changing its arrangement. When a second or later copy of the printed matter is made, the data line control circuit reads out the bitmap data sets at high speed.

11 Claims, 8 Drawing Sheets

TANDEM TYPE COLOR PRINTER CAPABLE OF MAKING PLURAL COPIES OF PRINTED MATTER AT HIGH SPEED

BACKGROUND OF THE INVENTION

This invention relates to a tandem type color printer having a plurality of printing units corresponding to colors and, in particular, to a tandem type color printer using bitmap data memorized in a memory to make plural copies of a printed matter.

A conventional tandem type color printer comprises four printing units located in line with predetermined intervals between each other on a conveyance route to print a color image or picture on a paper conveyed on the conveyance route. The printing units are, for example, electrophotographic printing units which has the same structure but which uses different color toners different from one another in color. For instance, the printing units are laser or LED array printing units and use yellow, magenta, cyan, and black toners, respectively. In this case, the printing units successively print a yellow constituent, a magenta constituent, a cyan constituent, and a black constituent of the color picture on the paper in synchronism with conveyance of the paper conveyed on the conveyance route.

The tandem type color printer further comprises a printer controller connected to a host computer to receive a printing request signal and a printing data set representative of the color picture from the host computer. When the printing data set is received, the printer controller converts it into a bitmap data including a yellow bitmap data set, a magenta bitmap data set, a cyan bitmap data set, and a black bitmap data set. Each of bitmap data sets consists of data lines corresponding to scanning lines of the color picture.

A head controller is connected between the printer controller and the printing units to transmit the bitmap data sets from the printer controller to the printing units. That is, the head controller supplies the yellow, the magenta, the cyan, and the black bitmap data sets to the yellow, the magenta, the cyan, the block printing unit, respectively in response to vertical synchronized signals and horizontal synchronized signals. For instance, the head controller supplies the data lines of the yellow bitmap data set to the yellow bitmap data set line by line in response to the horizontal synchronized signals for the yellow on condition that the vertical synchronized signal for the yellow is received.

Each of the printing units has a head and photosensitive drum in an exposing portion. The head is, for example, an LED array and exposes the photosensitive drum charged with electricity in response to the bitmap data set supplied from the head controller. As a result, a latent image is formed on a peripheral surface of the photosensitive drum. Next, the photosensitive drum is deposited by the use of the color toners to change the latent image into a color toner image. Then, the color toner image is transferred on the paper when the paper reaches the printing unit. After the four printing units transfer the color toner images on the paper one after another, the transferred images are fixed on the paper to form a printed image. Thus, the conventional tandem type color printer makes the printed matter with the printed image.

Such conventional tandem type color printer is disclosed in Japanese Unexamined Patent Publication (JP-A) No. 11-143163.

Generally, the printer controller supplies the bitmap data sets to not only to the head controller but also to a memory. The bitmap data sets are memorized in the memory and used for making plural copies of the printed matter. The memory may be a SDRAM (Static Dynamic Random Access Memory) or a hard disk apparatus.

The memory has a plurality of memorizing areas to separately store the yellow bitmap data set, the magenta bitmap data set, the cyan bitmap data set, and the black bitmap data set. In other words, the data lines of each bitmap data set are stored in an area having a plurality of continuous addresses.

To make the second or later copy of the printed matter, the printer controller reads out the yellow bitmap data set, the magenta bitmap data set, the cyan bitmap data set, and the black bitmap data set from the memory. In this time, the printer controller repeatedly selects one of the bitmap data sets by turns and read out one of the data lines of the selected bitmap data set during most of operation. Accordingly, the printer controller must access the memorizing areas arranged apart from one another by turns and takes a long time for reading the bitmap data sets. That is, the conventional tandem type color printer has a problem that a long time is necessary to read out the bitmap data sets from the memory. This is because change of the banks must be carried out in the SDRAM or a magnetic head must move for a long distance in the hard disk apparatus. In addition, the conventional tandem type color printer has another problem that a bus is occupied by the bitmap data sets read out from the memory.

SUMMARY OF THE INVENTION

It is therefore an object of this invention to provide a tandem type color printer capable of reducing a time for reading out bitmap data sets from a memory.

It is another object of this invention to provide a tandem type color printer capable of reducing a time that a bus is occupied by bitmap data sets read out a memory.

Other object of this invention will become clear as the description proceeds.

According to a first aspect of this invention, a tandem type color printer makes a printed matter according to bitmap data sets corresponding to colors, respectively. The tandem type color printer comprises a first memory for separately memorizing the bitmap data sets arranged in a first arrangement. A second memory is for mixedly memorizing the bitmap data sets arranged in a second arrangement different from the first arrangement. A data controller is connected to the first memory and the second memory to read out the bitmap data sets from the first memory when a first copy of the printed matter is made. The data controller stores the bitmap data sets read out from the first memory in the second memory in a case where a second copy of the printed matter is made. The data controller reads out the bitmap data sets from the second memory when the second copy of the printed matter is made.

According to a second aspect of this invention, a tandem type color printer makes a printed matter according to bitmap data sets corresponding to colors, respectively. Each of the bitmap data sets consists of a plurality of data lines. The tandem type color printer comprises a first memory for separately memorizing the bitmap data sets. A data controller is connected to the first memory and reads out the bitmap data sets from the first memory line by line in predetermined output order when a first copy of the printed matter is made. A second memory is connected to the data controller and memorizes the bitmap data sets supplied from the data controller so that each of the bitmap data sets is divided into a plurality of data units each of which has a predetermined size and that the data units of the bitmap data sets are arranged on the basis of the predetermined output order regardless of the colors. The data controller reads out the bitmap data sets from the second memory line by line in the predetermined output order when a second copy of the printed matter is made.

According to a third aspect of this invention, a method of outputting bitmap data sets corresponding to colors, respectively, in a tandem type color printer, comprises the steps of reading out, by the use of a data controller, the bitmap data sets from a first memory separately memorizing the bitmap data sets when a first copy of a printed matter is made, outputting, from the data controller, the bitmap data sets to make the first copy of the printed matter, storing the bitmap data sets from the data controller in a second memory with changing arrangement of the bitmap data sets, reading out, by the use of the data controller, the bitmap data sets from the second memory when a second copy of the printed matter is made, and outputting, from the data controller, the bitmap data sets to make the second copy of the printed matter.

According to a fourth aspect of this invention, a method of outputting bitmap data sets corresponding to colors, respectively, in a tandem type color printer, each of the bitmap data sets consisting of data lines, comprises the steps of receiving, at a data controller, a horizontal synchronized signal, judging, at the data controller, which color does the horizontal synchronized signal corresponds to, judging, at the data controller, whether the horizontal synchronized signal is for a first copy of a printed matter, reading out, by the use of the data controller, one data line of the bitmap data set corresponding to the color judged by the data controller from a first memory separately memorizing the bitmap data sets to output the data line when the data controller judges that the horizontal synchronized signal is for the first copy of the printed matter, judging, at the data controller, whether a second copy of the printed matter is made or not, judging, at the data controller, whether the data line can be stored in a present memorizing area of a second memory or not when the data controller judges that the second copy of the printed matter is made, the present memorizing area having a predetermined size and memorizing the preceding data line corresponding to the color, storing the data line in the present memorizing area when the data controller judges that the data line can be stored in the present memorizing area, storing the data line in another memorizing area having an address lager than that of the present memorizing area when the data controller judges that the data line can not be stored in the present memorizing area, and reading out, by the use of the data controller, the data line from the second memory to output the data line when the data controller judges that the horizontal synchronized signal is not for the first copy of the printed matter.

BRIEF DESCRIPTION OF THE DRAWING

FIG. 6 is a flow chart for describing a data line control circuit used in the tandem type color printer of FIG. 1;

DESCRIPTION OF THE PREFERRED EMBODIMENTS

Referring to FIGS. 1 to 5, description will be made about a tandem type color printer according to a first embodiment of this invention.

Figure 1:
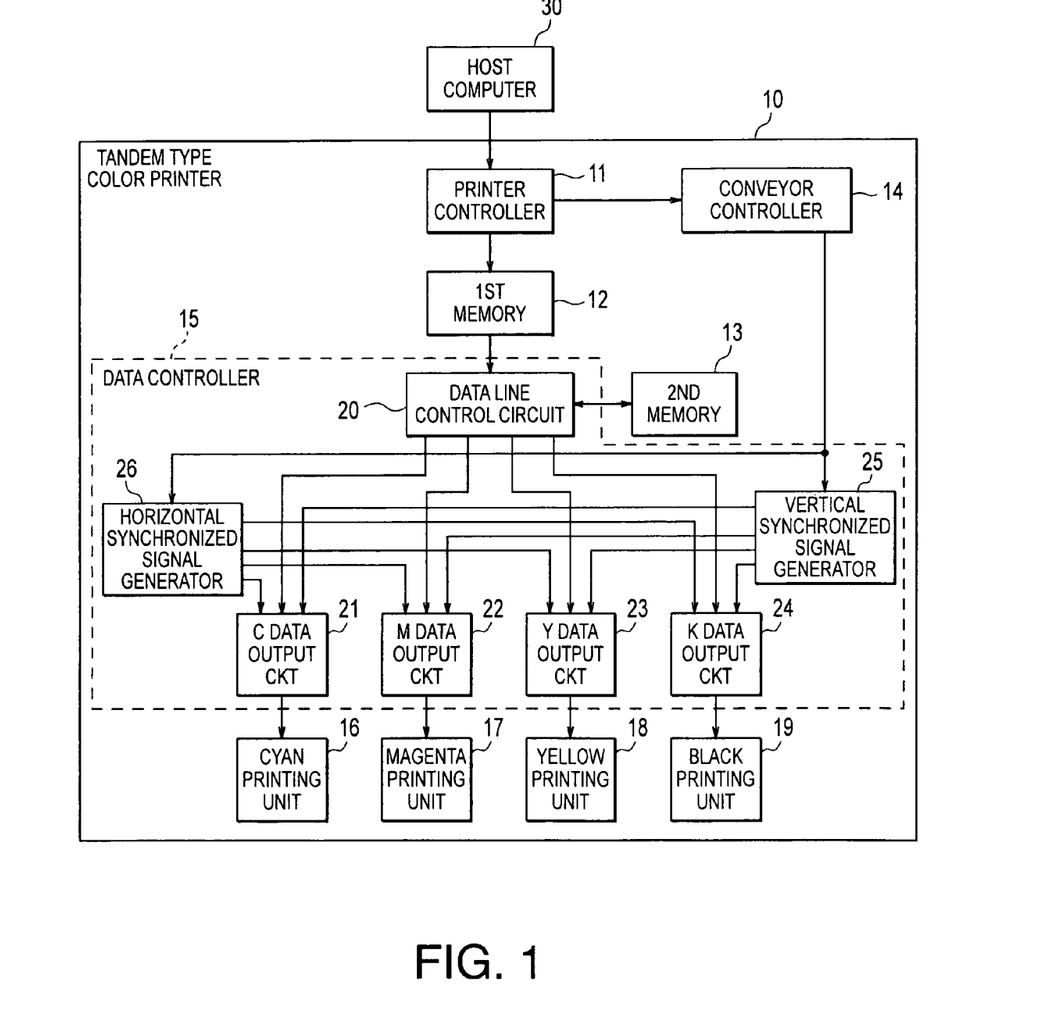
FIG. 1 is a block diagram of a tandem type color printer according to a first embodiment of this invention.

In FIG. 1, a tandem type color printer 10 comprises a printer controller 11, a first memory 12, a second memory 13, a conveyor controller 14, a data controller 15, and printing units 16–19. The data controller 15 includes a data line control circuit 20, data output circuit 21–24, a vertical synchronized signal generator 25, and a horizontal synchronized signal generator 26.

The printing units 16–19 are electrophotographic printing units having the same structure but use different color toners different from one another in color and located in line at predetermined intervals on a conveyance route (not shown) for conveying a paper (not shown). The printing units 16–19 correspond to cyan (C), magenta (M), yellow (Y), and black (K), respectively, and together print a color picture on the paper during conveyance of the paper.

The printer controller 11 is connected between a host computer 30 and the first memory 12 to receive a printing request signal and a printing data set representative of the color picture. Moreover, the printer controller 11 is connected to the conveyor controller 14 to request the conveyor controller 14 to convey the paper on the conveyance route when it receives the printing request signal. When the printing data set is received, the printer controller 11 changes the printing data set into bitmap data sets correspond to color ingredients, respectively. That is, the bitmap data sets include a cyan bitmap data set, a magenta bitmap data set, a yellow bitmap data set, and a black bitmap data set. The cyan, the magenta, the yellow, and the black bitmap data sets consist of cyan data lines, magenta data lines, yellow data lines, and black data lines, respectively.

Figure 2:
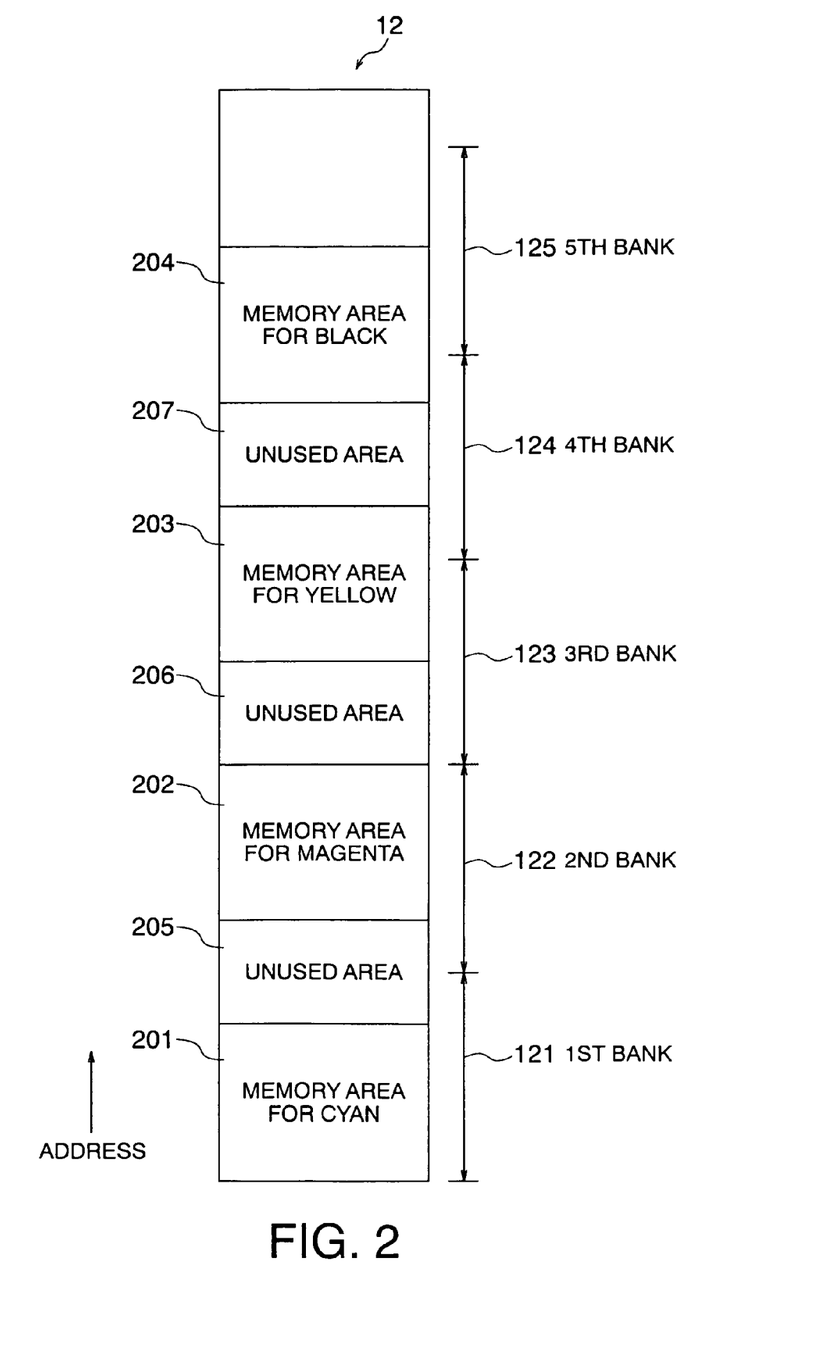
FIG. 2 shows an array of memory areas in a first memory used in the tandem type color printer of FIG. 1.

The first memory 12 is, for example, an SDRAM, a hard disk apparatus and so on and has a storage capacity of about from 1M bytes to 128M bytes. FIG. 2 shows array of memory areas for the bitmap date sets in the first memory 12. In FIG. 2, the first memory 12 is the SDRAM having first through fifth banks 121–125. The bitmap data sets are separately stored in memory areas 201–204, which are arranged apart from one another, of the first memory 12. That is, the cyan bitmap data set is stored in the memory area 201. The magenta bitmap data set is stored in the memory area 202. The yellow bitmap data set is stored in the memory area 203. The black bitmap data is stored in the memory area 204. Unused areas 205–207 are remained between neighboring two of the memory areas 201–204. Thus, the bitmap data sets are memorized in the first memory 12 in a first arrangement according to the colors. Additionally, the memory areas 201–204 are assigned regardless of boundaries of the banks 121–125. In this case, the memory area 203 extends to both of the third and the forth banks 123 and 124 while the memory area 204 extends to both of the fourth and the fifth banks 124 and 125. Each of the memory areas 201–204 for the bitmap data sets may be assigned in one of the banks 121–125.

Returning to FIG. 1, the second memory 13 is connected to the data line control circuit 20. The second memory 13 may be the same as the first memory 12 in structure but has different array of the memory areas for the bitmap data sets. The second memory 13 will be described in more detail later.

The conveyor controller 14 controls a conveyor (not shown) to convey the paper on the conveyor route and produce a timing signal.

The vertical synchronized signal generator 25 is connected to the conveyor controller 14 and the data output circuits 16–19 and generates first through fourth vertical synchronized signals in synchronism with the conveyance of the paper on the basis of the timing signal. That is, the vertical synchronized signal generator 24 supplies the first vertical synchronized signal to the cyan data output circuit 21 after a predetermined time from reception of the timing signal. After another predetermined time, the vertical synchronized signal generator 24 supplies the second vertical synchronized signal to the magenta data output circuit 21. After that, the vertical synchronized signal generator 24 supplies the third and the fourth vertical synchronized signals to the yellow and the black data output circuits 23 and 24, respectively, one after another.

The horizontal synchronized signal generator 26 is connected to the conveyor controller 14 and generates first through fourth sequences of horizontal synchronized signals on the basis of the timing signal. Namely, the horizontal synchronized signal generator 26 generates the horizontal synchronized signals of the first sequence at regular time intervals to supply them to the cyan data output circuit 21 after a predetermined time from when the first vertical synchronized signal is generated by the vertical synchronized signal generator 25. Similarly, the horizontal synchronized signal generator 26 generates the horizontal synchronized signals of the second sequence at regular time intervals to supply them to the magenta data output circuit 22 after the predetermined time from when the second vertical synchronized signal is generated by the vertical synchronized signal generator 25. The horizontal synchronized signals of the third sequence are generated by the horizontal synchronized signal generator 26 at regular time intervals to be supplied to the yellow data output circuit 23 after the predetermined time from when the third vertical synchronized signal is generated by the vertical synchronized signal generator 25. The horizontal synchronized signals of the fourth sequence are generated by the horizontal synchronized signal generator 26 at regular time intervals to be supplied to the black data output circuit 24 after the predetermined time from when the third vertical synchronized signal is generated by the vertical synchronized signal generator 25.

Each of the horizontal synchronized signals corresponds to one of data lines of the bitmap data sets. The horizontal synchronized signals of the first through the fourth sequences correspond to the cyan, the magenta, the yellow, the black data lines, respectively.

Most of generating periods of the first through the fourth sequences of the horizontal synchronized signals are simultaneous with one another but the horizontal synchronized signals are not simultaneous with one another.

The data output circuits 21–24 are connected to the data line control circuit 20, the vertical synchronized signal generator 25, and the horizontal synchronized signal generator 26. Moreover, the data output circuits 21–24 are connected to the printing units 16–19 and correspond to the cyan, the magenta, the yellow, and the black, respectively. The data output circuits 21–24 request the data line control circuit 20 to deliver the data lines of the bitmap data sets whenever they receives the horizontal synchronized signals.

The data line control circuit 20 supplies the cyan, the magenta, the yellow, and the black bitmap data sets to the printing units 16-19, respectively, in response to the request from them. The operation of the data line control circuit 20 will be described below in more detail.

Figure 3:
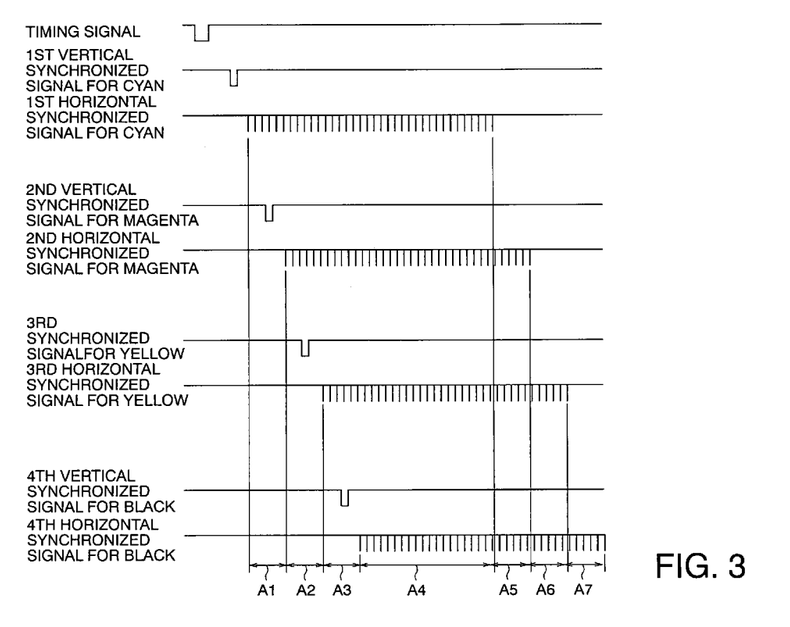
FIG. 3 is a timing chart for describing vertical and horizontal synchronized signal generators used in the tandem type color printer of FIG. 1.

FIG. 3 is a timing chart showing the timing signal, the first through the fourth vertical synchronized signals, and the first through the fourth sequences of the horizontal synchronized signals.

As illustrated in FIG. 3, the first through the fourth vertical synchronized signals are generated one after another after the timing signal is supplied to the vertical synchronized generator 25. A time interval between successive two of the vertical synchronized signals is equal to a time necessary to convey the paper between successive two of the printing units 16–19.

Each of the first through the fourth sequences of the horizontal synchronized signals is generated for a period corresponding to printing time for one sheet of the paper after the predetermined time from when the corresponding vertical synchronized signal is generated. In each sequence, the horizontal synchronized signals are periodically generated in regular cycles.

During a first period A1 of FIG. 3, only the cyan data output circuit 21 requests the data line control circuit 20 to periodically deliver the cyan data lines line by line in response to the horizontal synchronized signals of the first sequence.

During a second period A2, the magenta data output circuit 22 also requests the data line control circuit 20 to periodically deliver the magenta data lines line by line in response to the horizontal synchronized signals of the second sequence. In this period A2, the cyan data output circuit 21 and the magenta data output circuit 22 alternately request the data line control circuit 20 to deliver the data lines line by line.

During a third period A3, the yellow data output circuit 23 further requests the data line control circuit 20 to periodically deliver the yellow data lines line by line in response to the horizontal synchronized signals of the third sequence. In this period A3, the cyan, the magenta, and the yellow data output circuits 21, 22, and 23 repeatedly request the data line control circuit 20 to deliver the data lines by turns.

During a fourth period A4, the cyan, the magenta, the yellow, and the black data output circuits 21, 22, 23, and 24 repeatedly request the data line control circuit 20 to deliver the data lines by turns.

During a fifth period A5, the magenta, the yellow, and the black data output circuits 22, 23, and 24 repeatedly request the data line control circuit 20 to deliver the data lines by turns while the cyan data output circuit 21 does not operate.

During a sixth period A6, the yellow and the black data output circuits 23, and 24 alternately request the data line control circuit 20 to deliver the data lines while the cyan and the magenta data output circuit 21 and 22 does not operate.

During a seventh period A7, the black data output circuit 24 requests the data line control circuit 20 to deliver the black data lines alone.

The data line control circuit 20 reads out the bitmap data sets from the first memory 12 in response to the request from the data output circuits 21–24 when the first copy of the printed matter is made. If a plurality of copies of the printed matter is made, the data line control circuit 20 stores the bitmap data sets read out from the first memory 12 in the second memory 13 in a second arrangement different from the first arrangement. The second arrangement is suitable for quickly reading out the bitmap data sets. The data line control circuit 20 reads out the bitmap data sets from the second memory 13 in response to the request from the data output circuits 21–24 when the second or later copies of the printed matter are made.

Figure 4:
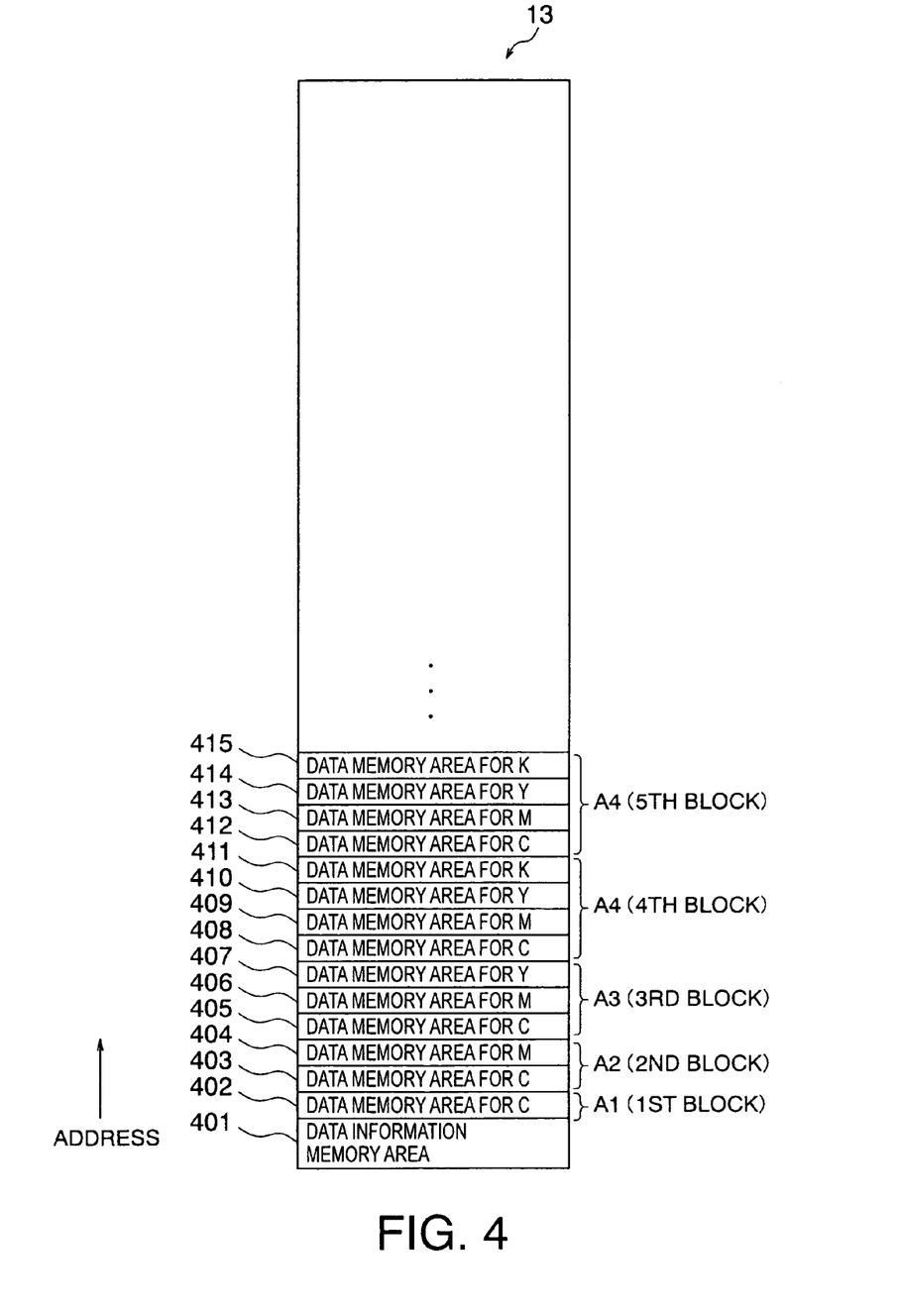
FIG. 4 shows an array of data memory areas in a second memory used in the tandem type color printer of FIG. 1.

FIG. 4 shows an example of array of memory areas for memorizing the bitmap data sets in the second memory 13.

In FIG. 4, the second memory 13 has a data information memory area 401 and data memory areas 402–415. The data memory areas 402–415 have the same size decided so as to memorize a data unit including the predetermined number of the data lines.

The data information memory area 401 stores information for reading out the bitmap data sets memorized in the data memory areas 402–405 of the second memory 13. The information includes the size of each of the data lines, the number of the data lines included in each data unit, and a start address of each of the data memory areas 402–415.

The size of the data memory areas 402–415 can be decided on the basis of the reading speed. Generally, the reading speed increases with reduction of the size of the data memory areas 402–415. In FIG. 4, the size of the data memory areas 402–415 larger than that of data lines read out during the period A1 of FIG. 3.

The data memory areas 402, 403, 405, 408, and 412 are used for memorizing the cyan bitmap data set. The data memory areas 404, 406, 409, and 413 are used for memorizing the magenta bitmap data set. The data memory areas 407, 410, and 414 are used for memorizing the yellow bitmap data set. The data memory areas 411 and 415 are used for memorizing the black bitmap data set. Thus, the data memory areas 402–415 are used for memorizing the data units arranged in output order regardless of corresponding colors.

The data memory area 402, which forms a first block, corresponds to the period A1 of FIG. 3. The data memory areas 403 and 404, which form a second block, correspond to the period A2 of FIG. 3. The data memory areas 405, 406, and 407, which form a third block, correspond to the period A3 of FIG. 3. The data memory areas 408–415, which form forth and fifth blocks, correspond to the period A4 of FIG. 3.

Because the data units are arranged according to the array of the data memory areas 402–415 as illustrated in FIG. 4, the data line control circuit 20 more quickly read out the bitmap data sets from the second memory 13 than read out them from the first memory 12. In a case where each of the blocks is arranged in any one of the banks, the data line control circuit 20 efficiently reads out the bitmap data sets from the second memory 13 in particular.

Figure 5:
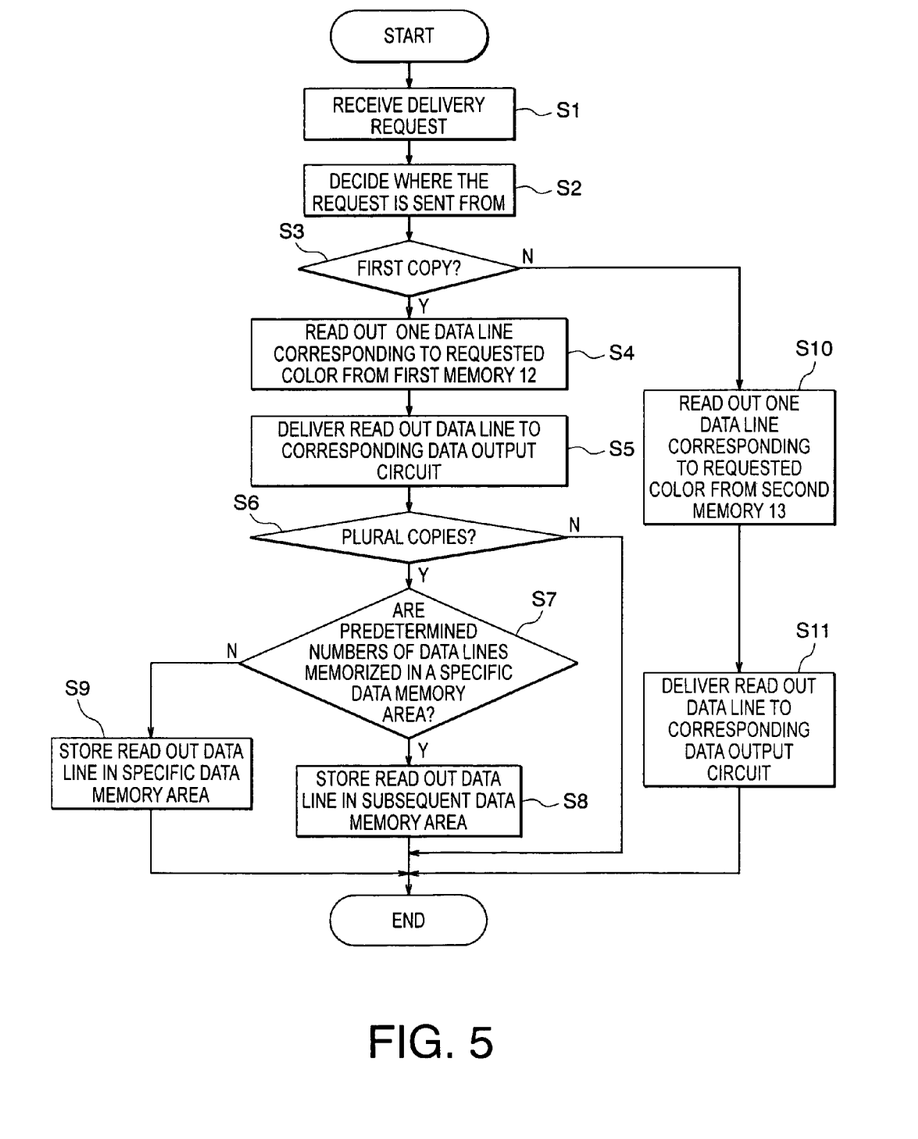

Next, the operation of the data line control circuit 20 will soon be mentioned in more detail with referring to FIG. 5.

The data output circuit 21–24 generate delivery request signals in response to the horizontal synchronized signals to request the data line control circuit 20 to deliver the data lines of the bitmap data sets. The data line control circuit 20 carries out the operation of FIG. 5 whenever each of the delivery request signals is received.

At first, when a certain delivery request signal is received at a step S1, the data line control circuit 20 decides where the delivery request signal is sent from (step S2). In other words, the data line control circuit 20 specifies a requested color requested by the delivery request signal.

Next, the data line control circuit 20 judges whether the delivery request signal is for the first copy of the printed matter or not (step S3). When the delivery request signal is for the first copy of the printed matter, the step S3 proceeds to a step S4. On the other hand, the step S3 jumps into a step S10 when the delivery request signal is for the second or later copy of the printed matter.

At the step S4, the data line control circuit 20 reads out one of the requested color data lines from the first memory 12. The read out data line is delivered to the requested color data output circuit which produces the delivery request signal (step S5).

Next, the data line control circuit 20 judges whether plural copies of the printed matter are made or not (step S6). In a case where the plural copies of the printed matter are made, the step S6 proceeds a step S7. On the other hand, the data line control circuit 20 finishes the operation in a case where only one copy of the printed matter is made.

At the step S7, the data line control circuit 20 judges whether or not the read out data line can be stored in a specific data memory area, which memorizes the preceding read out data line of the requested color, of the second memory 13. When the specific data memory area memorizes the predetermined number of the requested color data lines, the data line control circuit 20 judges that the read out data line can not be stored in the specific data memory area. When the specific data memory area does not memorize the predetermined number of the requested color data lines yet, the data line control circuit 20 judges that the read out data line can be stored in the specific data memory area.

When the read out data line can not be stored in the specific data memory area, the data line control circuit 20 stores the read out data line in a subsequent data memory area corresponding to the requested color (step S8). For instance, if the specific data memory area is the data memory area 402 then the read out data line is stored in the data memory area 403. Moreover, if the specific data memory area is the data memory area 403 then the read out data line is stored in the data memory area 405. Furthermore, if the specific data memory area is the data memory area 405 then the read out data line is stored in the data memory area 408. Still furthermore, if the specific data memory area is the data memory area 408 then the read out data line is stored in the data memory area 412. In this time, the data line control circuit 20 stores information representative of both of an start address of the subsequent data memory area and the size of the read out data line into the data information memory area 401 of the second memory 13.

On the other hand, the data line control circuit 20 stores the read out data line in the specific data memory area (step S9) when the read out data line can be stored in the specific data memory area. In this time, the data line control circuit 20 also stores the information representing the size of the read out data line into the data information memory area 401.

At the step S10, the data line control circuit 20 reads out the data line from the second memory 13 instead of the first memory 13. Next, the data line control circuit 20 delivers the read out data line to the requested color data output circuit which produces the delivery request signal.

The data line control circuit 20 operates as mentioned above whenever it receives a deliver request signal supplied from the data output circuits 21–24.

As easily understood from the above description, the time needed to read out the bitmap data sets from the second memory 13 is smaller than that in a case where the bitmap data sets are read out from the first memory 13. Consequently, the time that the bitmap data sets occupy a bus is reduced when the second and later copies of the printed matter are made.

Figure 6:
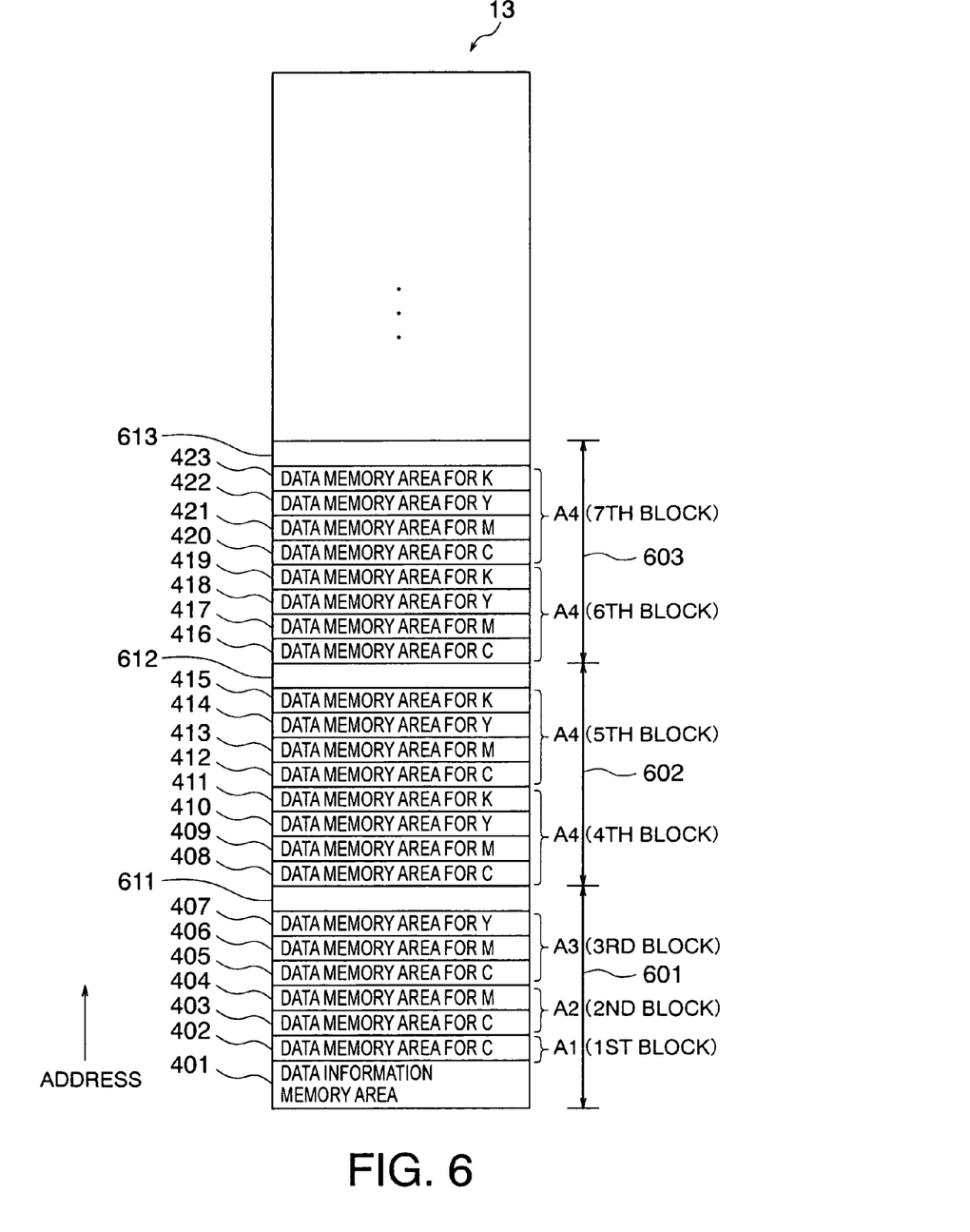
FIG. 6 shows an array of data memory areas in a second memory used in a tandem type color printer according to a second embodiment of this invention.
Figure 7:
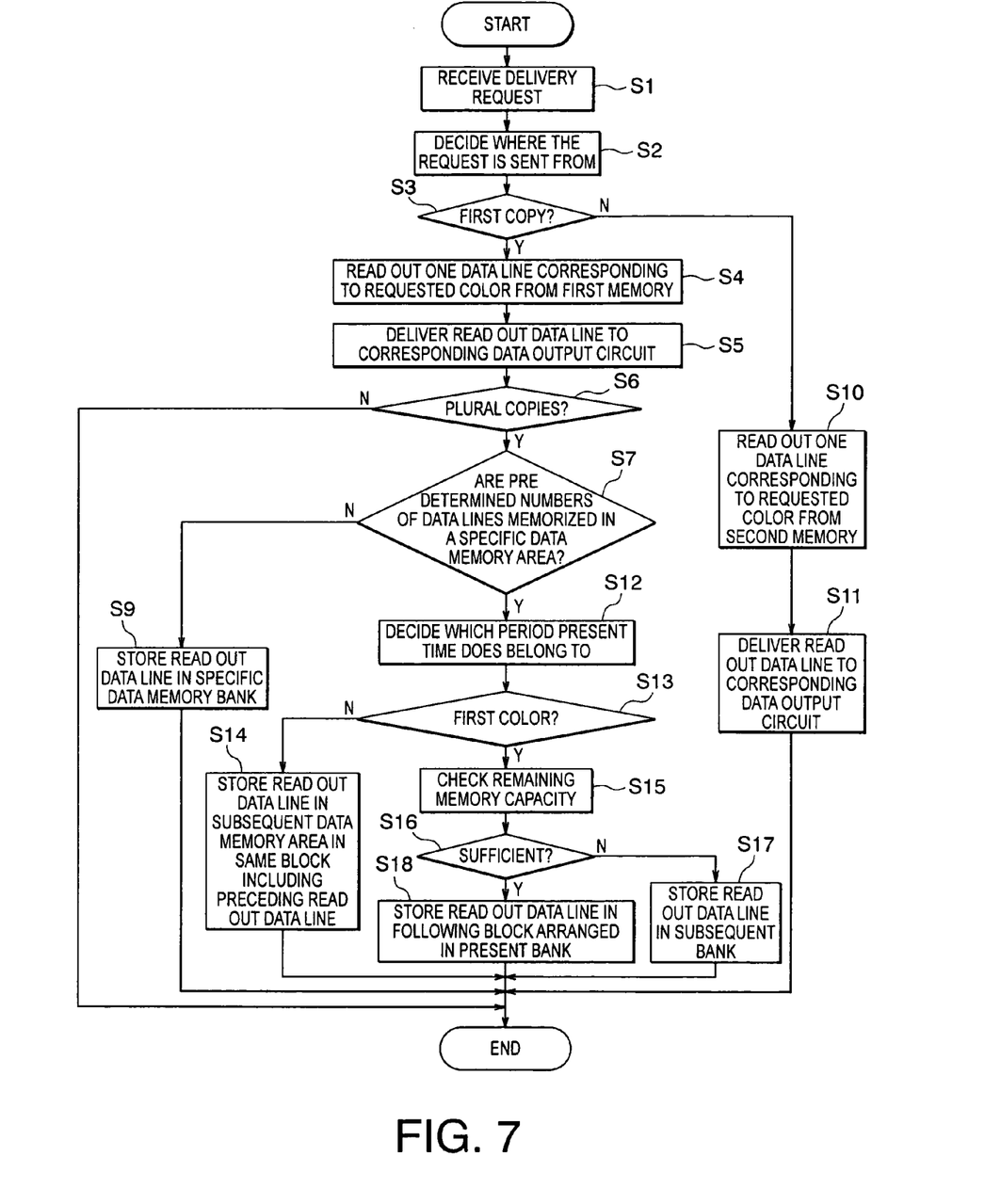
FIG. 7 is a flow chart for describing a data line control circuit used in the tandem type color printer of the second embodiment.

Referring to FIGS. 6 and 7, the description will proceed a tandem type color printer according to a second embodiment of this invention. The tandem type color printer is similar to the printer of FIG. 1 except for array of the data memory areas in the second memory 13 and for the operation of the data line control circuit 20.

FIG. 6 shows the array of the data memory areas in the second memory 13 having plural banks. In FIG. 6, the data memory areas 402–407 forming the first through the third blocks are arranged in a first bank 601. The data memory areas 408–415 forming the fourth and the fifth blocks are arranged in a second bank 602. Similarly, data memory areas 416–423 forming sixth and seventh blocks are arranged in a third bank 603. That is, the data memory areas 402–423 are arranged in the second memory 13 so that each block does not extend to over neighboring two banks. The banks 601–603 has unused areas 611–613, respectively.

The operation of the data line control circuit 20 is mentioned below with referring to FIG. 7. The steps S1–S11 of FIG. 7 are similar to those of FIG. 5 and explanation of them is omitted.

When the data line control circuit 20 judges that the read out data line can not be stored in the specific data memory area at the step S7, the step S7 proceeds a step S12.

At the step S12, the data line control circuit 20 decides which period does a present time belongs to. The present time belongs to any one of the periods A1, A2, A3, A4, A5, A6, and A7 of FIG. 3.

Next, the data line control circuit 20 judged whether the requested color is a first color in the decided period or not (step S13). For instance, the cyan is the first color in the periods A1, A2, A3, and A4. In the period A5, A6, and A7, the first color is the magenta, the yellow, and the black, respectively.

When the requested color is not the first color, the step S13 proceeds a step S14. On the other hand, the step S13 proceeds a step S15 when the requested color is the first color.

At the step S14, the data line control circuit 20 stores the read out data line in a subsequent data memory area for the requested color in the same block including the just preceding read out data line corresponding to another color different from the requested color (step S14). For example, the just preceding read out data line is stored in the data memory area 409 of FIG. 6, the read out data line is stored in a first address area of the data memory area 410.

At the step S15, the data line control circuit 20 checks remaining memory capacity of the present bank storing the just preceding read out data line (step S15). For example, when the just preceding read out data line is memorized in the data memory area 411 or 415 of FIG. 6, the data line control circuit 20 checks the remaining memory capacity of the second bank 602.

Next, the data line control circuit 20 judges whether the remaining memory capacity of the present bank is sufficient to store the following block or not (step S16). For example, when the just preceding read out data line is memorized in the data memory area 411 of FIG. 6, the second bank 602 has the remaining memory capacity which is sufficient to store the fifth block. On the other hand, when the just preceding read out data line is memorized in the data memory area 415 of FIG. 6, the second bank 602 does not have the remaining memory capacity which is sufficient to store the sixth block.

When the remaining memory capacity is not sufficient to store the following block, the data line control circuit 20 stores the read out data line in the subsequent bank (step S17). For example, the just preceding read out data line is memorized in the data memory area 415 of FIG. 6, the read out data line is stored in a first address area of the data memory area 416 belonging to the third bank 603. On the other hand, the data line control circuit 20 stores the read out data line in the following block arranged in the present bank when the remaining memory capacity is sufficient to store the following block (step S18). For example, the just preceding read out data line is memorized in the data memory area 411 of FIG. 6, the read out data line is stored in a first address area of the data memory area 412 belonging to the fifth block arranged in the second bank 603.

According to this embodiment, each block of the data memory areas does not extend over neighboring two banks. Therefore, it is possible to read out the bitmap data sets from the second memory and to make the plural copies of the printed matter at high speed.

While this invention has thus far been described in conjunction with a few embodiments thereof, it will readily be possible for those skilled in the art to put this invention into practice in various other manners. For example, a memory apparatus may serve both as the first memory 12 and the second memory 13. Moreover, the data line control circuit 20 may provides a compression/expansion circuit as illustrated in FIG. 8.

Figure 8:
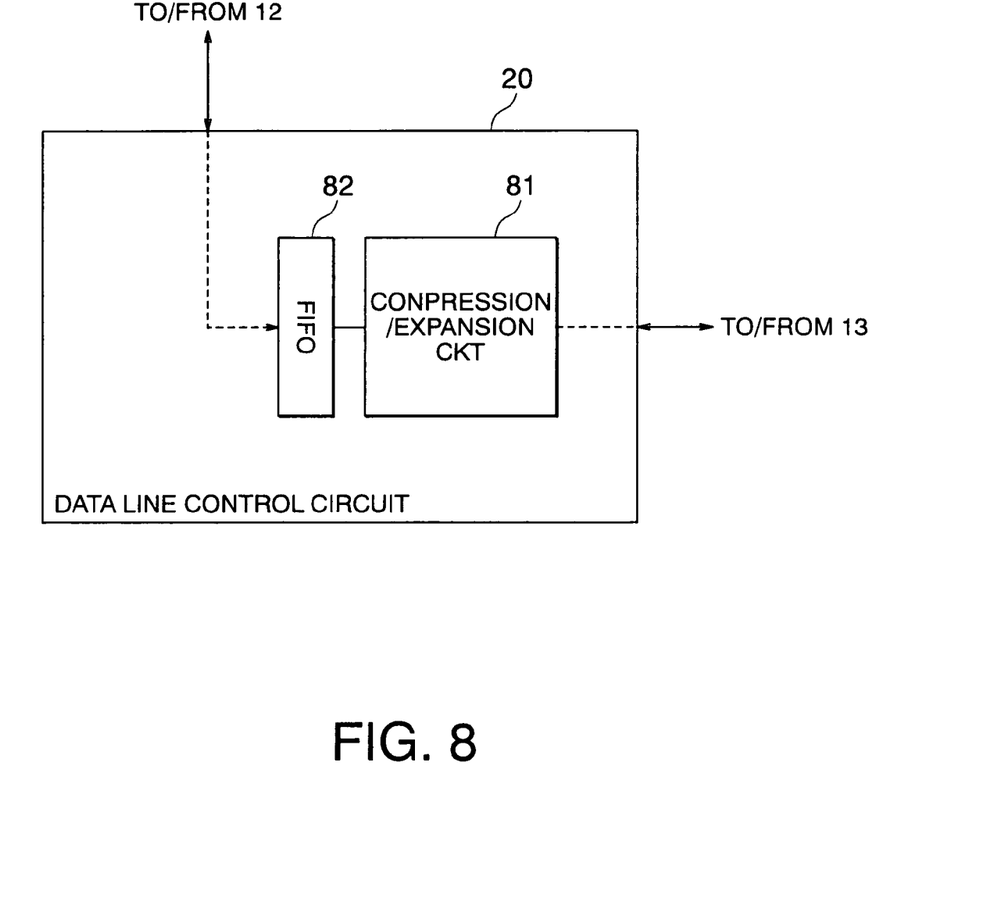
FIG. 8 is a block diagram of a modified data line control circuit used in the tandem type color printer of the first or the second embodiment.

In FIG. 8, the compression/expansion circuit 81 is combined with a buffer or FIFO memory 82 for memorizing plural data lines. The compression/expansion circuit 81 reversibly compresses the bitmap data sets to generate compressed bitmap data sets when the bitmap data set is memorized in the second memory 13. Moreover, the compression/expansion circuit 81 expands the compressed bitmap data sets when the bitmap data sets are supplied to data output circuits 21–24. The compression/expansion circuit 81 is effective in a case where it takes long time to read and/or writ the bitmap data sets from/to the second memory 13.

What is claimed is:

1. A tandem type color printer for making a printed matter according to bitmap data sets corresponding to colors, respectively, said tandem type color printer comprising:
    a first memory for separately memorizing bitmap data sets arranged in a first arrangement,
    a second memory for mixedly memorizing said bitmap data sets stored in said first memory but arranged in a second arrangement different from said first arrangement,
    a data controller connected to said first memory and said second memory for reading out said bitmap data sets from said first memory when a first copy of said printed matter is made, for storing said bitmap data sets read out from said first memory in said second memory in a case where a second copy of said printed matter is made, and for reading out said bitmap data sets from said second memory when said second copy of said printed matter is made.

2. A tandem type color printer claimed in claim 1, each of said bitmap data sets comprising data lines, wherein said second arrangement is that each of said bitmap data sets is divided into a plurality of data units each of which includes a predetermined number of said data lines, and that said data units of said bitmap data sets are arranged on the basis of predetermined output order regardless of said colors.

3. A tandem type color printer for making a printed matter according to bitmap data sets corresponding to colors, respectively, each of said bitmap data sets comprising a plurality of data lines, said tandem type color printer comprising:
- a first memory for separately memorizing said bitmap data sets,
- a data controller connected to said first memory, for reading out said bitmap data sets from said first memory line by line in predetermined output order when a first copy of said printed matter is made, and
- a second memory, connected to said data controller, for memorizing said bitmap data sets from said first memory which are supplied from said data controller so that each of said bitmap data sets is divided into a plurality of data units each of which has a predetermined size and that said data units of said bitmap data sets are arranged on the basis of said predetermined output order regardless of said colors,
- wherein said data controller reads out said bitmap data sets from said second memory line by line in said predetermined output order when a second copy of said printed matter is made.

4. A tandem type color printer as claimed in claim 3, wherein said data controller reads out one of said data lines of the bitmap data sets in response to a horizontal synchronized signal.

5. A tandem type color printer as claimed in claim 4, said horizontal synchronized signal corresponding to one of said colors, wherein said data controller reads out said data line from said bitmap data set corresponding to the color.

6. A tandem type color printer as claimed in claim 3, wherein the predetermined size is larger than that of a predetermined number of said data lines.

7. A tandem type color printer as claimed in claim 3, wherein each of said data units is located in a bank.

8. A tandem type color printer as claimed in claim 3, wherein said data controller supplies said bitmap data sets to said second memory only when it judges that said second copy of said printed matter is made.

9. A tandem type color printer as claimed in claim 3, wherein said data controller includes a compression/expansion circuit which compresses said bitmap data sets to store compressed bitmap data sets in said second memory and which expands said compressed bitmap data sets read out from said second memory.

10. A method of outputting bitmap data sets corresponding to colors, respectively, in a tandem type color printer, comprising:
- reading out, by the use of a data controller, said bitmap data sets from a first memory separately memorizing said bitmap data sets when a first copy of a printed matter is made,
- outputting, from said data controller, said bitmap data sets from said first memory, to make said first copy of said printed matter,
- storing said bitmap data sets from said first memory which are output from said data controller, in a second memory with changing an arrangement of said bitmap data sets,
- reading out, by the use of said data controller, said bitmap data sets from said second memory when a second copy of said printed matter is made, and
- outputting, from said data controller, said bitmap data sets from said second memory, to make said second copy of said printed matter.

11. A method of outputting bitmap data sets corresponding to colors, respectively, in a tandem type color printer, each of said bitmap data sets consisting of data lines, comprising:
- receiving, at a data controller, a horizontal synchronized signal,
- judging, at said data controller to which color said horizontal synchronized signal corresponds,
- judging, at said data controller, whether said horizontal synchronized signal is for a first copy of a printed matter,
- reading out, by the use of said data controller, one data line of said bitmap data set corresponding to the color judged by said data controller from a first memory separately memorizing said bitmap data sets to output said data line when said data controller judges that said horizontal synchronized signal is for said first copy of said printed matter,
- judging, at said data controller, whether a second copy of said printed matter is made or not,
- judging, at said data controller, whether said one data line from said first memory can be stored in a present memorizing area of a second memory or not when said data controller judges that said second copy of said printed matter is made, said present memorizing area having a predetermined size and memorizing the preceding data line corresponding to the color,
- storing said data line in said present memorizing area when said data controller judges that said data line can be stored in said present memorizing area,
- storing said data line in another memorizing area having an address larger than that of said present memorizing area when said data controller judges that said data line cannot be stored in said present memorizing area, and
- reading out, by the use of said data controller, said data line from said second memory to output said data line when said data controller judges that said horizontal synchronized signal is not for said first copy of said printed matter.

* * * * *